United States Patent [19]

Leiber

[11] Patent Number: 4,526,203
[45] Date of Patent: Jul. 2, 1985

[54] ELECTROMAGNETIC VALVE

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 380,306

[22] Filed: May 20, 1982

[30] Foreign Application Priority Data

Jun. 9, 1981 [DE] Fed. Rep. of Germany ....... 3122747

[51] Int. Cl.³ .............................................. F16K 31/10
[52] U.S. Cl. ............................ 137/627.5; 137/596.17
[58] Field of Search ............ 137/596.17, 627.5, 625.65

[56]    References Cited
U.S. PATENT DOCUMENTS

| 3,921,666 | 11/1975 | Leiber | 137/627.5 X |
| 3,970,111 | 7/1976 | Brune | 137/627.5 |
| 3,989,063 | 11/1976 | Brouwers | 137/627.5 X |
| 4,312,380 | 1/1982 | Leiber et al. | 137/627.5 |

FOREIGN PATENT DOCUMENTS

| 1284225 | 11/1968 | Fed. Rep. of Germany | 137/625.65 |
| 215601 | 11/1968 | U.S.S.R. | 137/625.65 |

Primary Examiner—Robert G. Nilson
Attorney, Agent, or Firm—Edwin E. Greigg

[57]    ABSTRACT

An electromagnetic valve having an armature isolated from the flow of pressure medium and a valve actuated by the armature via a push rod. The armature is variously excitable at various current intensities ($i_1$, $i_2$) and is accordingly capable of assuming three different positions. In this manner, a three-position magnetic valve is created which in its neutral positions keeps open a flow of pressure medium to a consumer while closing a leakage conduit. In its second position, the valve closes off the consumer, and in its third position it connects the consumer with a return flow conduit. The electromagnetic valve is usable preferably in anti-wheel-locking apparatuses in motor vehicles.

5 Claims, 4 Drawing Figures

ELECTROMAGNETIC VALVE

BACKGROUND OF THE INVENTION

The invention is based on an electromagnetic valve of the general type having an armature isolated from the flow of pressure medium and a valve actuated by the armature via an actuating push rod, said valve being disposed with its valve closing body in a passageway which experiences the flow through it of a pressure medium. A valve of this type is known (German Offenlegungsschrift No. 30 06 576).

The known electromagnetic valve is a two-way valve having a seated valve which upon excitation of the magnet is forced open by the armature via a push rod. It has the disadvantage that is is capable of assuming only two positions and that in order to attain a three-positional function, two such two-position valves are necessary.

A further disadvantage is that such a valve can be used only for compressed air and that in its outset position it is not tightly sealed. Finally, its sole purpose is flow control; it does not have a seated valve capable of completely shutting off the flow.

A magnetically actuated three-position valve does already exist (German Auslegeschrift No. 22 57 213); however, in this known valve there is a flow of pressure medium through the armature. This is disadvantageous if the valve must be designed for high pressures, because the sheath receiving the armature must then be especially embodied so that it is absolutely pressure-tight. This is complicated and expensive.

OBJECT AND SUMMARY OF THE INVENTION

The electromagnetic valve of this invention has the advantage over the prior art that because of the separation of the magnetic circuit from the pressure medium circuit, both the magnet element and the valve element can be optimized separately in terms of structure and manufacturing methods, thus making it possible to reduce costs substantially.

The valve element is accommodated in a special carrier, and the armature force is exerted on this carrier via the push rod.

The carrier may be embodied as particularly small, which results in small functional surface areas and thus in relatively small pressure forces at high pressures.

The valve element can furthermore be conceived as a modular unit. There is also no valve leakage in the resting position, because in this position a ball-seal valve is closed.

Finally, it is also possible to dispose two or more carriers in sequence i.e., one after another, each being actuatable by intermediate push rods. In this manner, it is possible to put together larger multi-position valves, such as a 5/4-way valve. Multi-position valves of this kind are particularly advantageous for use in an anti-wheel-locking apparatus in motor vehicles.

The invention will be better understood and further objects and advantages thereof will become more apparent from the ensuing detailed description of preferred embodiments taken in conjunction with the drawings.

DESCRIPTION OF THE EXEMPLARY EMBODIMENTS

Figure 1:
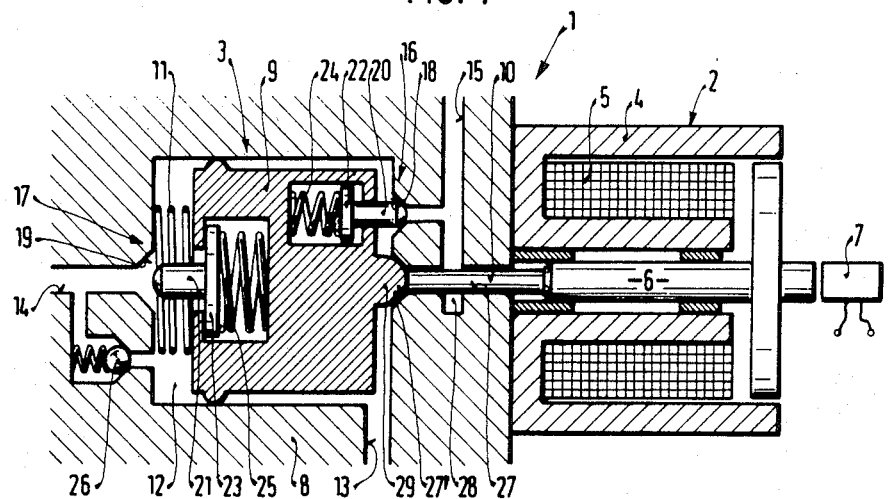
FIG. 1 shows a cross sectional view basic embodiment of the electromagnetic valve.

An electromagnetic valve 1 has a magnetic element 2 and a valve element 3. The magnetic element 2 has a housing 4, a coil 5 and an armature 6, which on its side remote from the valve element 3 is directed out of the housing 4 and there cooperates with a travel transducer 7. This travel transducer 7 may, however, be omitted.

The housing 4 is mounted on a housing 8 of the valve element 3. A carrier 9 is disposed in the valve element 3 and is movable by the armature 6 via an actuating push rod 10. A spring 11 which acts upon the carrier 9 serves to assure that the interconnection of the armature 6, push rod 10 and carrier 9 is maintained.

The carrier 9 and spring 11 are disposed in a valve chamber 12, which is connected continuously at one end, via a conduit 13, to a wheel brake cylinder, not shown. On the other end, a valve-monitored conduit 14 which communicates with a main cylinder (again not shown) is provided. Finally, a further valve-monitored conduit 15 also exits from the chamber 12 and leads into a return flow line returning to a point of lower pressure, such as a refill container, not shown.

The valve monitoring of the two conduits 14 and 15 is performed by two seat-type valves 16 and 17, that is, an inlet valve 17 and an outlet valve 16, whose valve seats 18 and 19 are formed at the outlets of the conduits into the chamber 12. The closing bodies 20 and 21 for these valves are mushroom-shaped in embodiment, and springs 24 and 25 which are supported in the carrier 9 act upon widened heads 22 and 23 of the closing bodies 20 and 21. The closing bodies 20 and 21 are received with their heads 22 and 23 by the carrier 9, and they are also guided by the carrier 9.

The inlet valve 17 can be bypassed by a check valve 26 opening in the direction toward the main cylinder, and a bore 27 which receives the actuating push rod 10 is connected via a leakage conduit 28 to the return flow conduit 15. The entry to the bore 27 is also monitored by a sealing-ball closing body 29, which is molded onto the carrier 9. The bore 27 has a valve seat 27' for the sealing-ball closing body 29, which in the position of rest tightly closes this seat 27'.

Mode of Operation

In the resting position of the electromagnetic valve, there is free passage within the valve element 3 from the main cylinder to the wheel brake cylinders. The inlet valve 17 is opened and the outlet valve 16 is closed; the valve 27'/29 is also closed at the bore 27 which receives the actuating rod 19 by the spring 11, which acts upon the carrier 9.

Figure 3:
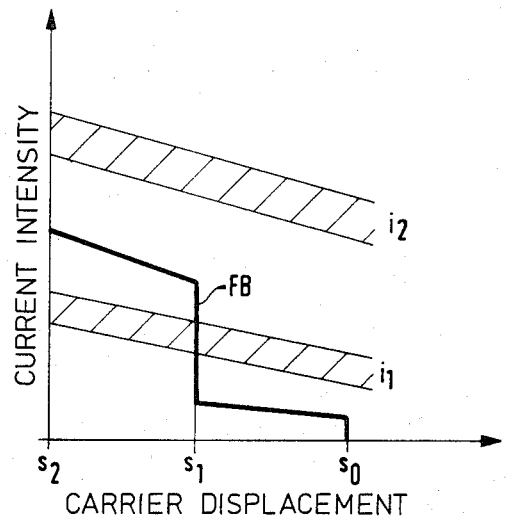
FIG. 3 shows diagramatically the path of the lines of force in the type of device shown in FIG. 1.

For the sake of further explaining the mode of operation, the force-lines diagram of FIG. 3 will also be referred to. If the magnetic element 2 is excited with a current level $i_1$, then the armature 6 presses against the actuating push rod 10 and the latter presses the sealing ball 29, along with the carrier 9, into the chamber 12 counter to the force of the spring 11. In the diagram, the distance between $s_0$ and $s_1$ is traversed. The closing body 21 reaches its seat 19 and the inlet valve 17 is closed. Further movement of the carrier 9 is temporarily precluded by the fact that the spring 25 acts as a barrier spring and the magnetic force, at this excitation level $i_1$, does not suffice to compress this spring 25.

Now if the magnetic element is excited to a further level $i_2$, the force of the barrier spring 25 is overcome; the armature 6, the actuating push rod 10 and the carrier 9 move further to the left. The head 22 of the closing body 20 of the outlet valve 16 is now engaged by the carrier 9 and the closing body 20 is lifted from its seat 18. The outlet valve is opened. The inlet valve 17 remains closed. In the diagram, the position $s_2$ has been attained. Pressure medium is now capable of flowing back from the wheel brake cylinder to the refill container.

The electronic circuit required for an appropriate supply of electrical current to the electromagnetic valve when this valve is used in an anti-wheel-locking apparatus is not the subject of the present invention. This circuit is described instead in German Ausleges-chrift No. 22 57 213 discussed above.

The travel transducer mentioned in the description can be used instead of the barrier spring 25 in order to perform the positional regulation of the magnet armature 6 at a particular time. An electronic circuit for performing this task is again known in the prior art.

Figure 2:
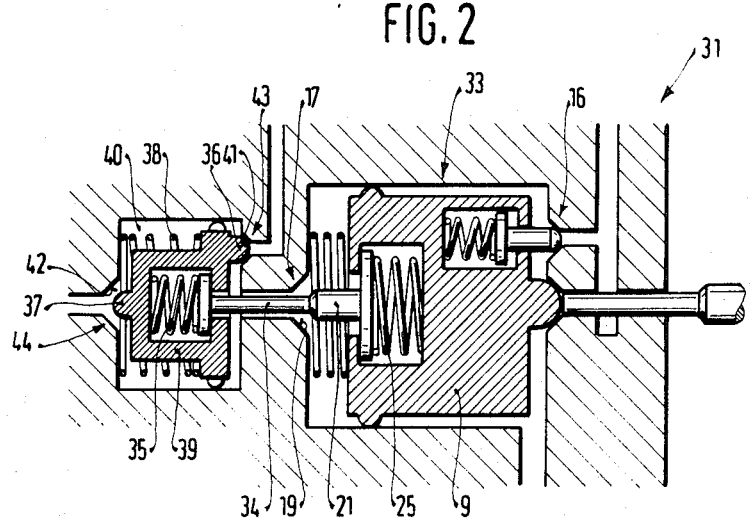
FIG. 2 also shows a cross sectional view of a modification of the type of device shown in FIG. 1.

The modification shown in FIG. 2 shows one type of electromagnetic valve 31 which is for the most part structured identically to that of FIG. 1. For this reason, corresponding elements have the same reference numerals.

In this modification, a valve element 33 is shown which is embodied as a 5/4-way multi-position valve. To this end, two carriers 9 and 39 are disposed sequentially i.e., one after the other. The closing body 21 is provided with a further push rod 34 which passes through the valve seat 29 and which acts via a spring 35 upon the carrier 39.

The carrier 39 carries two closing bodies 36 and 37 and is movable within a chamber 40 counter to the force of a spring 38. The chamber 40 has two valve seats 41 and 42 at conduit discharge points; together with the closing bodies 36 and 37, these valve seats 41 and 42 comprise one inlet valve 43 and one outlet valve 44.

Figure 4:
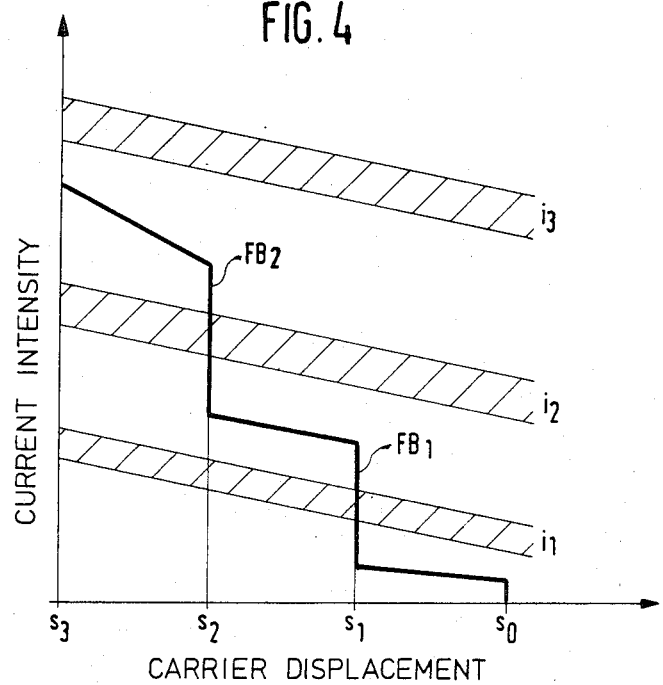
FIG. 4 shows diagramatically the path of the lines of force in the type of device shown in FIG. 2.

If excitation at a current level $i_1$ occurs with this valve type, then the two carriers 9 and 39 move from position $s_0$ into position $s_1$ (see FIG. 4). In position $s_1$, the barrier spring force of spring 35 becomes effective and prevents a further movement of the valve closing bodies. The outlet valve 44 is closed at such a time, while the inlet valve 43 is opened.

In the second excitation stage $i_2$, a movement of the apparatus into position $s_2$ occurs. A barrier force $FB_2$ acts within the carrier 39. The valve 44 remains closed, the valve 43 remains opened and the valve 17 is closed.

In a third excitation stage $i_3$, the barrier forces $FB_1$ and $FB_2$ of the springs 35 and 25 are overcome, with the result that the carriers 9 and 39 move into position $s_3$. In this position, the outlet valve 16 is then opened.

It should be further noted that the actuating push rod 10 is capable of acting not only directly upon the carrier 9; it is also possible to have this push rod act indirectly upon the carrier 9 via a wedge or a lever.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electromagnetic valve comprising a housing means having a plurality of chambers, a reciprocating armature means housed in a first one of said chambers that is isolated from a pressure medium, and a valve means housed in a second one of said chambers in communication with a fluid pressure medium source via a plurality of conduits in said housing means which includes said second chamber, said valve means including a carrier member movable within said second chamber by said armature means via an actuating push rod that extends from said first chamber into said second chamber between said armature means and said carrier means, a plurality of valve elements carried on said carrier member for controlling pressure medium flow through respective aligned conduits, at least two of said valve elements each having a biasing means urging the valve element toward the conduit with which it is in alignment.

2. An electromagnetic valve as defined by claim, 1 in which said valve closure means comprises two carrier members disposed in axial alignment, each carrier member having a plurality of valve elements.

3. An electromagnetic valve as defined by claim 2, in which each said carrier member includes a barrier spring.

4. An electromagnetic valve as defined by claim 1, in which said actuating push rod is inserted with close tolerance in a bore through the wall of said first chamber.

5. An electromagnetic valve as defined by claim 1, in which each of said biasing means comprises a pre-stressed spring arranged to urge its related valve element outwardly of said carrier member, and a further spring interposed between the carrier means and a wall of the housing which forces said carrier means toward said actuating rod, and one of said pre-stressed springs functions as a barrier spring which temporarily precludes displacement of the actuating rod from said first chamber.

* * * * *